US012116151B2

(12) United States Patent
Lee et al.

(10) Patent No.: US 12,116,151 B2
(45) Date of Patent: Oct. 15, 2024

(54) TAMPING SIMULATOR AND ASSOCIATED METHOD

(71) Applicant: AJIX, INC., Dania Beach, FL (US)

(72) Inventors: Stephen Lee, Dania Beach, FL (US); Joseph Quist, Dania Beach, FL (US); Delbert Jepperson, Orem, UT (US); Jason Jepperson, Orem, UT (US); Andreas J. Bertele, Orem, UT (US)

(73) Assignee: CAPSCANADA CORPORATION, Windsor (CA)

( * ) Notice: Subject to any disclaimer, the term of this patent is extended or adjusted under 35 U.S.C. 154(b) by 0 days.

(21) Appl. No.: 18/078,278

(22) Filed: Dec. 9, 2022

(65) Prior Publication Data

US 2023/0182934 A1 Jun. 15, 2023

Related U.S. Application Data

(60) Provisional application No. 63/287,612, filed on Dec. 9, 2021.

(51) Int. Cl.
*B65B 1/24* (2006.01)
*A61J 3/07* (2006.01)

(52) U.S. Cl.
CPC ................. *B65B 1/24* (2013.01); *A61J 3/075* (2013.01)

(58) Field of Classification Search
CPC ..... B65B 1/24; B65B 1/20; B65B 1/22; A61J 3/075; A61J 3/074; B61B 1/26; A61K 3/071
See application file for complete search history.

(56) References Cited

U.S. PATENT DOCUMENTS

| | | | | | |
|---|---|---|---|---|---|
| 2,720,109 | A * | 10/1955 | Stirn | G01N 9/00 141/73 |
| 4,116,247 | A * | 9/1978 | Zanasi | B65B 1/38 141/81 |
| 4,864,876 | A * | 9/1989 | Botzolakis | A61J 3/074 73/862.541 |
| 5,417,903 | A | 5/1995 | Harrison | |
| 2011/0318411 | A1* | 12/2011 | Luber | B29C 43/146 514/648 |
| 2021/0106500 | A1* | 4/2021 | Runft | A61J 3/074 |
| 2022/0008289 | A1* | 1/2022 | Rowan | A61J 1/03 |

OTHER PUBLICATIONS

International Search Report and Written Opinion, dated May 15, 2023 for International Application No. PCT/US2022/052339, 21 pages.

* cited by examiner

*Primary Examiner* — Thomas M Wittenschlaeger
*Assistant Examiner* — Himchan Song
(74) *Attorney, Agent, or Firm* — Moore & Van Allen PLLC

(57) ABSTRACT

Tamping simulators are provided. The tamping simulator includes a powder cylinder; a dosing receptacle; a tamping pin having a first end and a second end, the tamping pin being configured to be moved between a raised position and a lowered position such that the second end is received into the powder cylinder and the dosing receptacle in an instance in which the tamping pin is in the lowered position; a tamping spring operably coupled to the first end of the tamping pin and being configured to relieve compression pressure from the tamping pin; and a compression scale operably coupled to the tamping spring and being configured to indicate an amount of compression pressure absorbed by the tamping spring.

20 Claims, 8 Drawing Sheets

TAMPING SIMULATOR AND ASSOCIATED METHOD

CROSS REFERENCE AND PRIORITY CLAIM UNDER 35 U.S.C. § 119

This application claims priority to U.S. Provisional Application No. 63/287,612 entitled "TAMPING SIMULATOR AND ASSOCIATED METHOD" filed on Dec. 9, 2021, which is assigned to the assignees hereof and hereby expressly incorporated by reference herein.

FIELD

The presently-disclosed invention relates generally to replicating and predicting settings for tamping style capsule filling equipment and, more particularly, tamping simulators and methods of replicating and predicting settings for tamping style capsule filling equipment for a powder.

BACKGROUND

In the pharmaceutical and nutritional supplement industries, tamping style capsule filling equipment is used to fill capsules with a powder of interest by separating two-piece capsules, filling them, closing them, and ejecting them for further processing and handling. These filling machines fill the capsules by preforming a slug of powder through a five-step compression process that allows for clean transfer using the correct amounts of powder. The dosing area can be the most complex part of the filling machine for operators to set-up. The current methods used are largely based on trial and error, resulting in inefficiencies in production due to time and material loss.

In some cases, a slug tester may be used to determine filling equipment settings. While the slug tester is a useful tool, it is limited to identifying dosing disc thickness and slug quality (i.e., whether the powder will form into a slug). It displays digitally the pressure used in forming a slug, but the measurements do not translate well to settings for configuring the filling equipment. Indeed, the filling equipment does not utilize digital readouts for displaying compressing forces, and, as such, the slug tester is not used to determine tamping pin settings.

Accordingly, there still exists a need for a device for approximating filling equipment settings in advance, including, but not limited to, dosing disc thickness, powder level settings, slug quality, and tamping pin settings.

BRIEF SUMMARY

One or more embodiments of the invention may address one or more of the aforementioned problems. Certain embodiments according to the invention provide tamping simulators. The tamping simulator includes a powder cylinder; a dosing receptacle; a tamping pin having a first end and a second end, the tamping pin being configured to be moved between a raised position and a lowered position such that the second end is received into the powder cylinder and the dosing receptacle in an instance in which the tamping pin is in the lowered position; a tamping spring operably coupled to the first end of the tamping pin and being configured to relieve compression pressure from the tamping pin; and a compression scale operably coupled to the tamping spring and being configured to indicate an amount of compression pressure absorbed by the tamping spring.

According to certain embodiments, the tamping simulator may further comprise a penetration scale disposed between the compression scale and the tamping spring. In some embodiments, the penetration scale may be configured to indicate tamping pin depth within the bore.

According to certain embodiments, the tamping simulator may further comprise a handle operably connected to the first end of the tamping pin. The handle may be configured to move the tamping pin between the raised position and the lowered position.

According to certain embodiments, the tamping simulator may comprise a plurality of tamping pins. In some embodiments, each of the plurality of tamping pins may have a different standardized pin size.

According to certain embodiments, the powder cylinder may comprise clear glass or clear plastic.

According to certain embodiments, the tamping simulator may further comprise a powder dispersal mechanism. In some embodiments, the powder dispersal mechanism may comprise a disc ratcheting mechanism or a powder stirring mechanism.

According to certain embodiments, the tamping simulator may be configured to replicate and predict settings for tamping style capsule filling equipment for a target drug, dietary supplement, or nutritional supplement. In some embodiments, the settings may comprise tamping pin settings for one or more tamping stations, dosing disc thickness, powder level settings, slug forming qualities, or any combination thereof.

In another aspect, rotatable dosing discs for tamping simulators are provided. The rotatable dosing disc includes a first surface configured to be positioned adjacent to and in alignment with a powder cylinder of the tamping simulator; a second surface opposite the first surface; a bore extending from the first surface to the second surface and being configured to receive a tamping pin; and a thickness adjustment device disposed at the second surface and being operably coupled to the bore to adjust bore thickness.

According to certain embodiments, the thickness adjustment device may comprise a threaded pin having a diameter substantially equal to a diameter of the bore, a plunger operably coupled to the threaded pin, and a rotatable dial operably coupled to the threaded pin and being configured to adjust a position of the plunger in relation to the bore. In this way, the plunger and walls of the bore define a dosing receptacle, and adjustment of the bore thickness modifies a volume of the dosing receptacle so as to accommodate different dosages for filling capsules.

In some embodiments, the rotatable dosing disc may comprise a plurality of thickness adjustment devices. In certain embodiments, each of the plurality of thickness adjustment devices may be disposed at one of the plurality of tamping stations, and each of the plurality of thickness adjustment devices may be operably coupled to one of the plurality of evenly-spaced bores.

According to certain embodiments, the rotatable dosing disc may comprise a plurality of evenly-spaced bores. In some embodiments, each of the plurality of evenly-spaced bores may be disposed at one of a plurality of tamping stations positioned around a circumference of the rotatable dosing disc. In certain embodiments, each of the plurality of evenly-spaced bores may have a different standardized diameter.

In yet another aspect, methods of replicating and predicting settings for tamping style capsule filling equipment for a powder are provided. The method includes selecting a bore diameter, a bore thickness, and a tamping pin size; receiving a volume of powder in a powder cylinder; compressing the powder into a dosing receptacle defined by a plunger and walls of a bore of a rotatable dosing disc having the selected bore diameter and the selected bore thickness by moving a tamping pin having the selected tamping pin size from a raised position to a lowered position into the powder cylinder and the dosing receptacle; and indicating an amount of compression pressure absorbed by a tamping spring operably coupled to the tamping pin in an instance in which the tamping pin is moved to the lowered position.

According to certain embodiments, the method may further comprise indicating tamping pin penetration into the bore.

According to certain embodiments, the method may further comprise dispersing the powder in the powder cylinder after compressing the powder into the dosing receptacle. In some embodiments, dispersing the powder may comprise ratcheting the dosing disc or stirring the powder.

According to certain embodiments, the method may further comprise compressing the powder at least one additional time (e.g., four additional times) and dispersing the powder each time the powder is compressed.

According to certain embodiments, the settings may comprise tamping pin settings for one or more tamping stations, dosing disc thickness, powder level settings, slug forming qualities, or any combination thereof.

According to certain embodiments, following the five-step compression process, the powder may be ejected from the rotatable dosing disc using the thickness adjustment device to evaluate slug quality and the weight of the powder.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
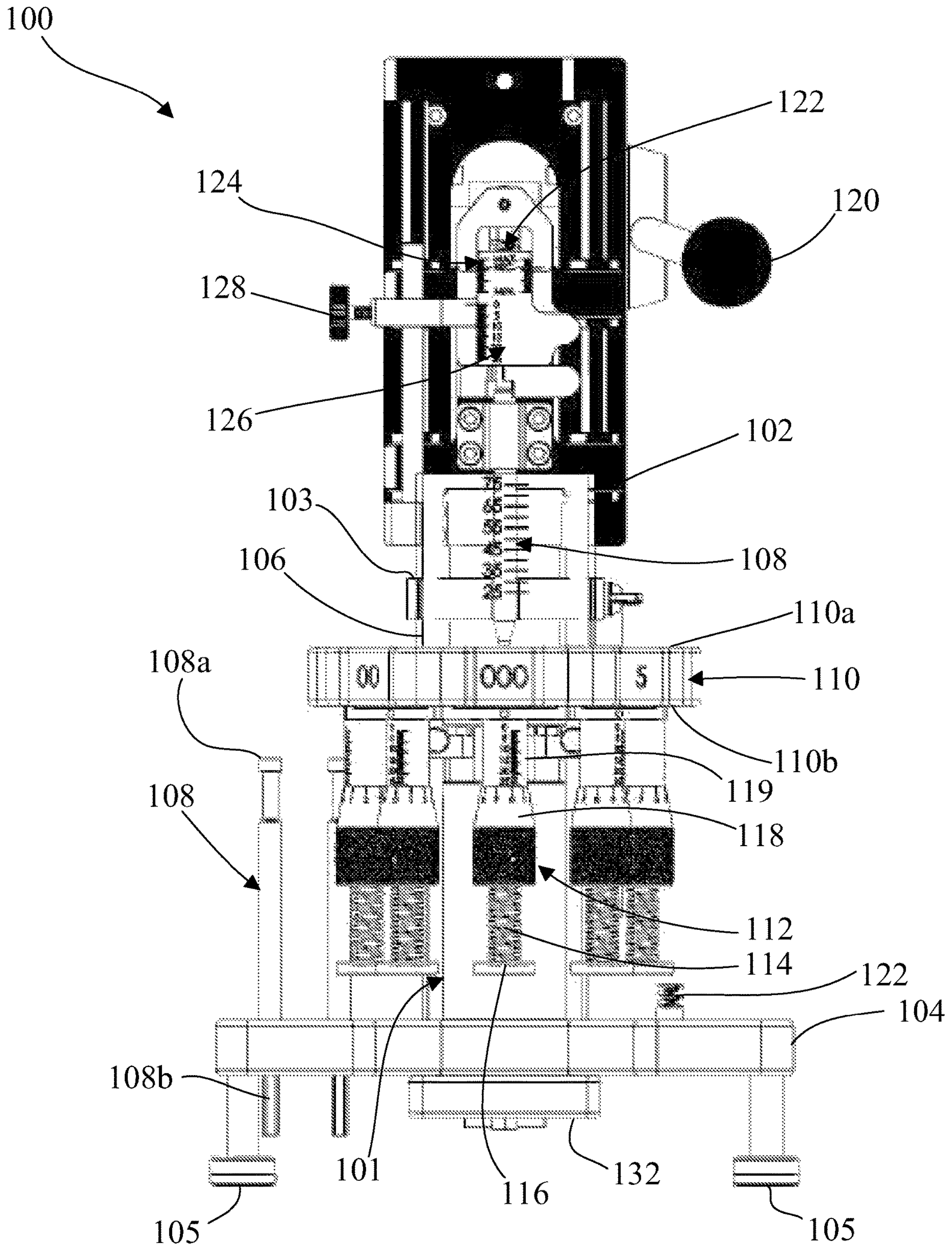
FIG. 1 is a front view of a tamping simulator in accordance with certain embodiments of the invention.

The invention now will be described more fully hereinafter with reference to the accompanying drawings, in which some, but not all embodiments of the inventions are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a," "an," and "the" include plural referents unless the context clearly dictates otherwise. Moreover, as used herein, terms such as "top," "bottom," "left," "right," etc. are used for explanatory purposes in the present disclosure to describe the relative position of certain components or portions of components. Furthermore, as would be evident to one of ordinary skill in the art in light of the present disclosure, the term "substantially" indicates that the referenced element or associated description is accurate to within applicable engineering tolerances.

The invention includes, according to certain embodiments, devices and methods for replicating and predicting settings for tamping style capsule filling equipment for a powder. Such devices and methods may be used by research and development personnel to determine if powders are ready for use in filling equipment, as well as to identify changes that can be made prior to widescale production, including via machine adjustment or via the addition of product excipients to meet desired characteristics, such as slug quality and dose weight. Moreover, the devices and methods described herein may also be used by production personnel for individual production batches to predict machine setup parameters, accounting for batch-to-batch variation. Such parameters or settings include, but are not limited to, tamping pin settings for one or more tamping stations, dosing disc thickness, powder level settings, slug forming qualities, or any combination thereof. These parameters, particularly disc thickness, powder level settings, and resulting compression, may be used to determine end capsule weight. In addition, the devices and methods described herein utilize the exact tamping pins and spring used on the filling equipment such that the devices and methods provide a direct translation to machine settings. As such, by using the devices and methods described herein, one knowledgeable person in the production area can predetermine the settings for less experienced operators, conserving time and material and eliminating the requirement that all operators be experts in filling equipment operation. In this way, the devices and methods disclosed herein are able to replicate and predict filling equipment settings to improve the efficiency of the capsule production process.

I. Tamping Simulators

In particular, according to a first aspect of the invention, a tamping simulator is provided. The tamping simulator includes a powder cylinder; a dosing receptacle; a tamping pin having a first end and a second end, the tamping pin being configured to be moved between a raised position and a lowered position such that the second end is received into the powder cylinder and the dosing receptacle in an instance in which the tamping pin is in the lowered position; a tamping spring operably coupled to the first end of the tamping pin and being configured to relieve compression pressure from the tamping pin; and a compression scale operably coupled to the tamping spring and being configured to indicate an amount of compression pressure absorbed by the tamping spring.

Also provided is a rotatable dosing disc for a tamping simulator. The rotatable dosing disc includes a first surface configured to be positioned adjacent to and in alignment with a powder cylinder of the tamping simulator; a second surface opposite the first surface; a bore extending from the first surface to the second surface and being configured to receive a tamping pin; and a thickness adjustment device disposed at the second surface and being operably coupled to the bore to adjust bore thickness.

Figure 1A:
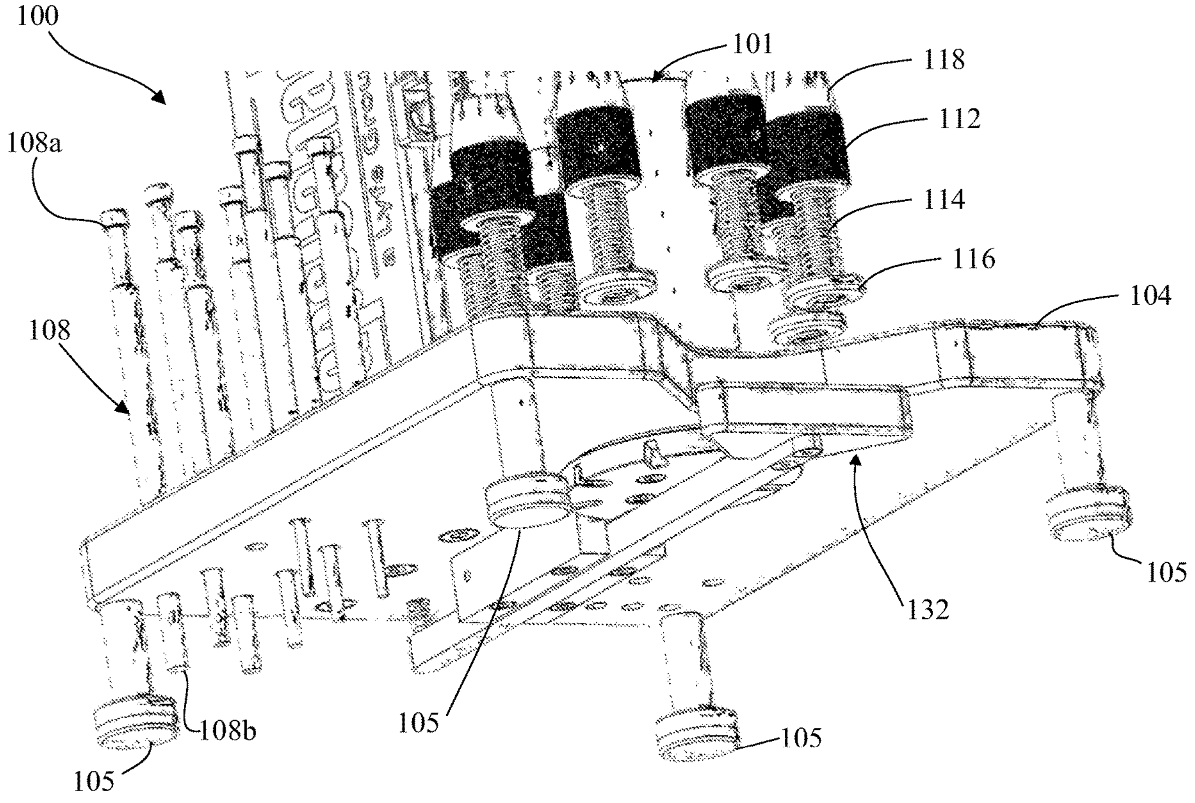
FIG. 1A is a bottom view of a tamping simulator in accordance with certain embodiments of the invention.

Turning now to FIG. 1, a tamping simulator 100 is illustrated in accordance with certain embodiments of the invention. As shown in FIG. 1, in certain embodiments, the tamping simulator may include a body 101 with a tamping bracket 102 affixed thereto at a first end of the body 101. On one end of the body 101 opposite the tamping bracket 102, the body 101 may be fixed to a base 104. The base 104 may include one or more feet 105 or similar stabilizing features as understood by a person of ordinary skill in the art. For example, the base 104 may include one, two, or more bearings sitting into the top of the base 104 around the body 101. In certain embodiments, the top of the base 104 may include a housing around the body 101 to support and hide the bearing(s). In some embodiments, a lever 132 (best shown in FIGS. 1A, 2, and 3) may be attached to the body 101 under a recessed portion of the base 104, which may be used to lock the disc into position and then to release the disc for movement.

Figure 2:
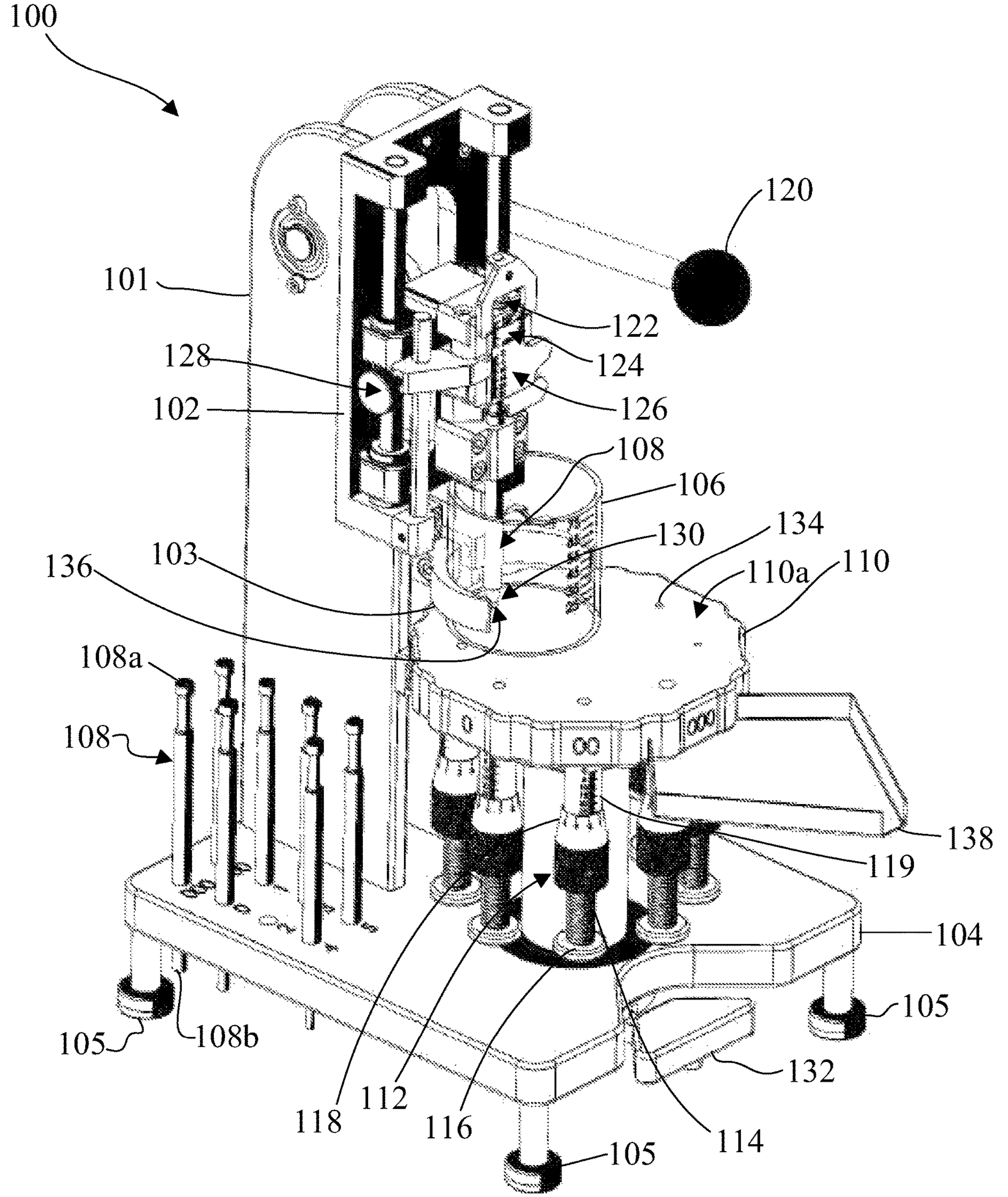
FIG. 2 is a perspective side view of a tamping simulator in accordance with certain embodiments of the invention.

The tamping simulator 100 also includes a powder cylinder 106 that is connected to the body 101 via a clamp 103 or similar mechanism for grasping and stabilizing the powder cylinder 106, as understood by a person of ordinary skill in the art. The powder cylinder 106 of the tamping simulator 100 may replicate the product bowl of the filling machine used in actual production. A powder of interest (e.g., a drug or supplement in solid particulate form) may be placed within the powder cylinder 106 for use in the tamping simulator 100. In some embodiments, the powder cylinder 106 may be a graduated cylinder. For instance, and as shown in FIGS. 1 and 2, the powder cylinder 106 may include measurement markings in mm and/or inches. Moreover, in certain embodiments, the powder cylinder 106 may be transparent. For example, in some embodiments, the powder cylinder 106 may comprise clear glass or clear plastic. In certain embodiments, the measurement markings may be in color and/or engraved (e.g., via laser or any other suitable method understood by a person of ordinary skill in the art) to improve marking visibility. In this way, an operator of the tamping simulator 100 may be able to view and accurately measure the powder contained in the powder cylinder 106, such as by comparing a level of the powder within the powder cylinder 106 to the measurement markings on the powder cylinder. In addition, at least a portion of both ends of the powder cylinder 106 are open. In this way, at least a portion of the top of the powder cylinder 106 is open to receive the powder, and at least a portion of the bottom of the powder cylinder 106 is open and positioned on a rotatable dosing disc 110, as described below.

Figure 4:
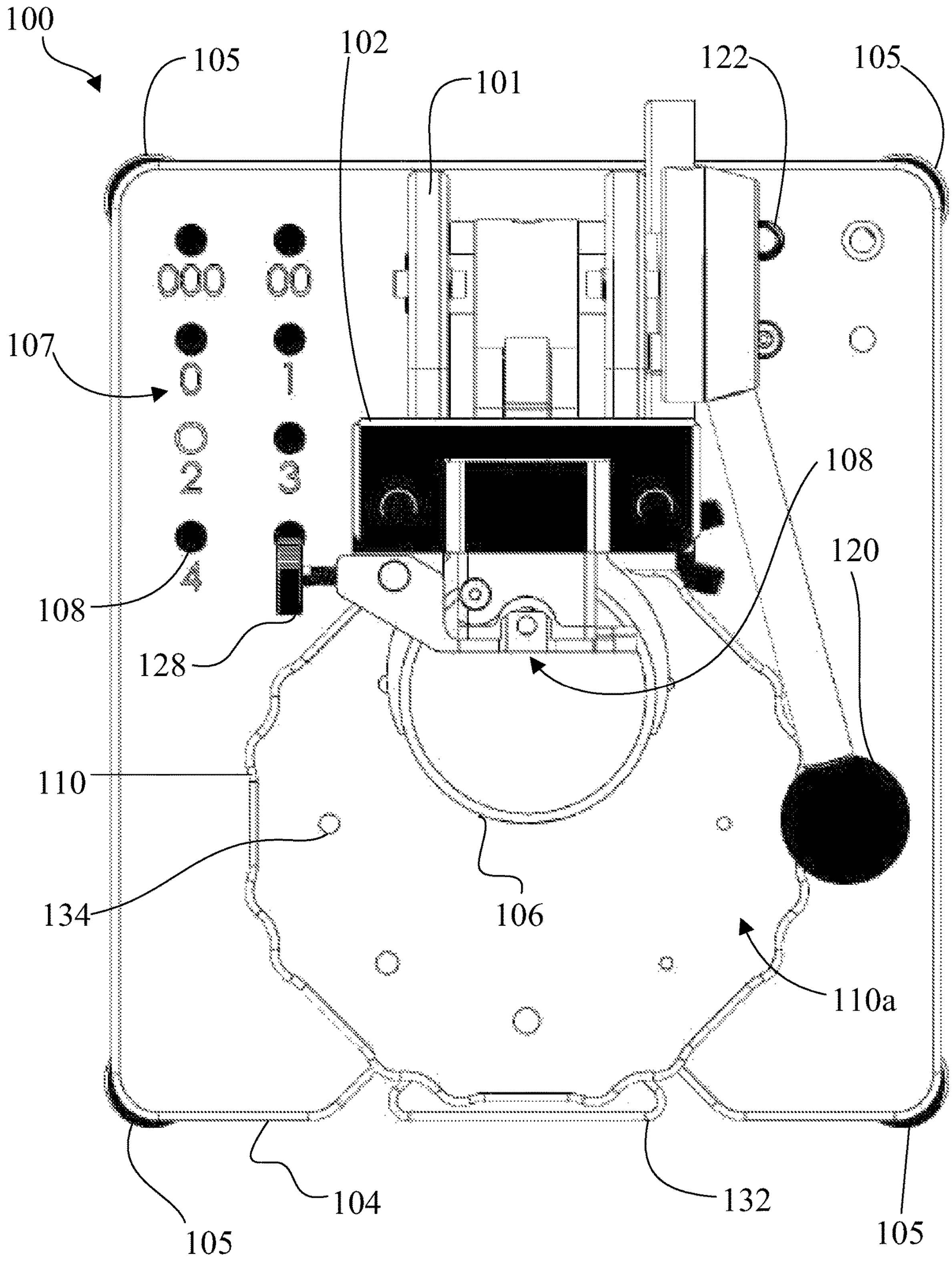
FIG. 4 is a top view of a tamping simulator in accordance with certain embodiments of the invention.

The tamping simulator 100 further includes a tamping pin 108 having a first end 108*a* and a second end 108*b*. The tamping pin 108 may be moved between a raised position and a lowered position. In the lowered position, the second end 108*b* of the tamping pin 108 moves through the powder cylinder 106 and into a bore 134 in the rotatable dosing disc 110. In some embodiments, the tamping simulator 100 may include a handle 120 operably connected to the first end 108*a* of the tamping pin 108 such that the handle 120 may be gripped by an operator and used to move the tamping pin 108 between the raised position and the lowered position through the powder cylinder 106 and into the bore 134. In some embodiments, the handle 120 may be operably connected to one or more springs (not shown) to provide resistance during compression to prevent an operator from moving the tamping pin 108 past a targeted tamping depth. In this way, the tamping pin 108 may compress the powder 109 using its second end 108*b* and move it into the rotatable dosing disc 110, thereby compressing the powder 109 within a volume defined by the rotatable dosing disc 110 and the tamping pin 108, as described in more detail below and shown in FIG. 7. According to certain embodiments, the tamping simulator 100 may include a plurality of tamping pins 108, each of which having a different standardized tamping pin size that corresponds to a standardized capsule size ranging from 5 to 000 (e.g., 5, 4, 3, 2, 1, 0, 00, and 000 capsule sizes). This range of parts will also work for elongated capsules (e.g., 0 elongated, 00 elongated, etc). While a selected standardized tamping pin size is in use, the remaining tamping pins may be stored in a holding area 107 on the base 104, as shown in FIG. 4, until one of the stored pins is needed based on the corresponding capsule size being dosed.

Figure 3:
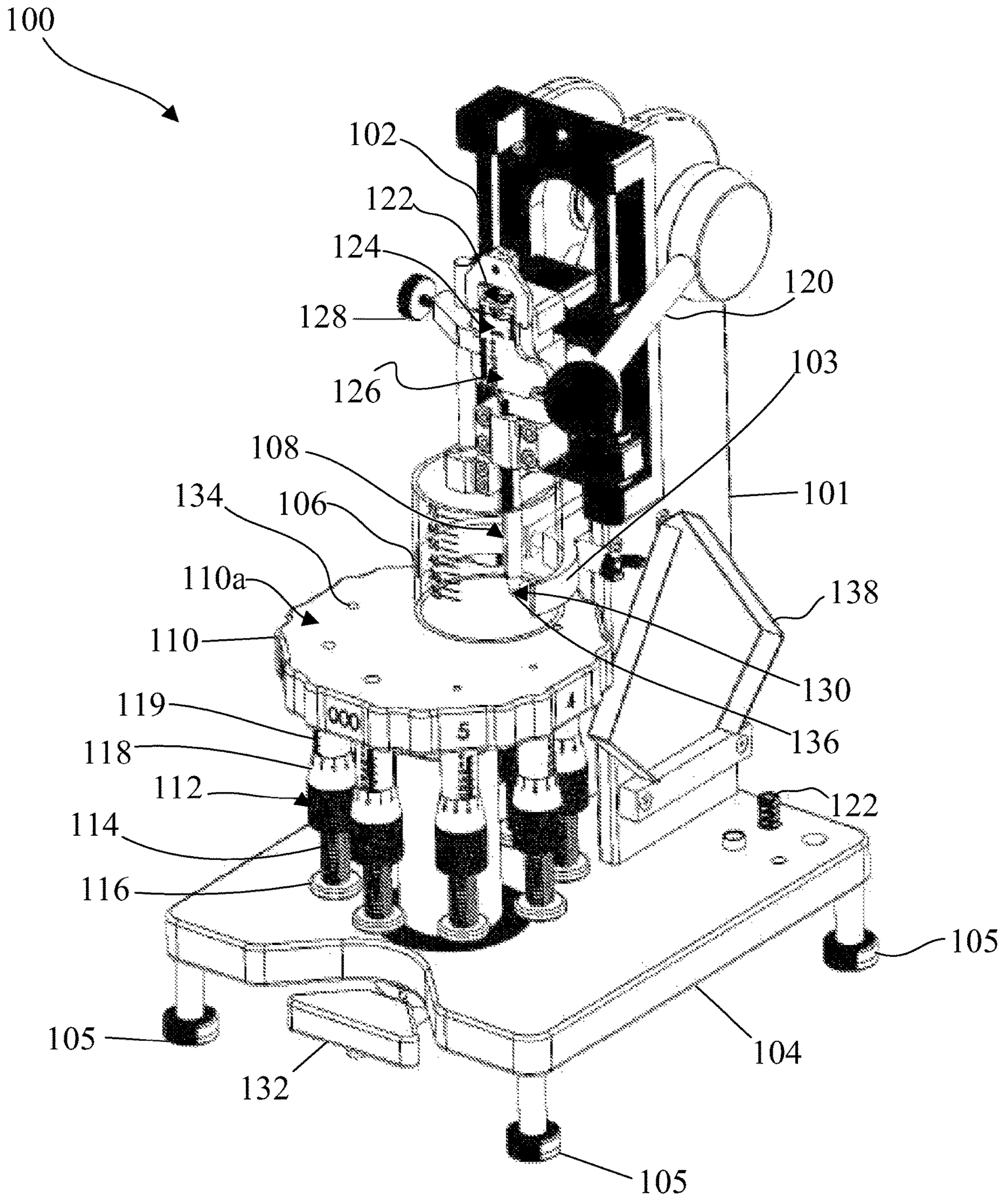
FIG. 3 is another perspective side view of a tamping simulator in accordance with certain embodiments of the invention.
Figure 7:
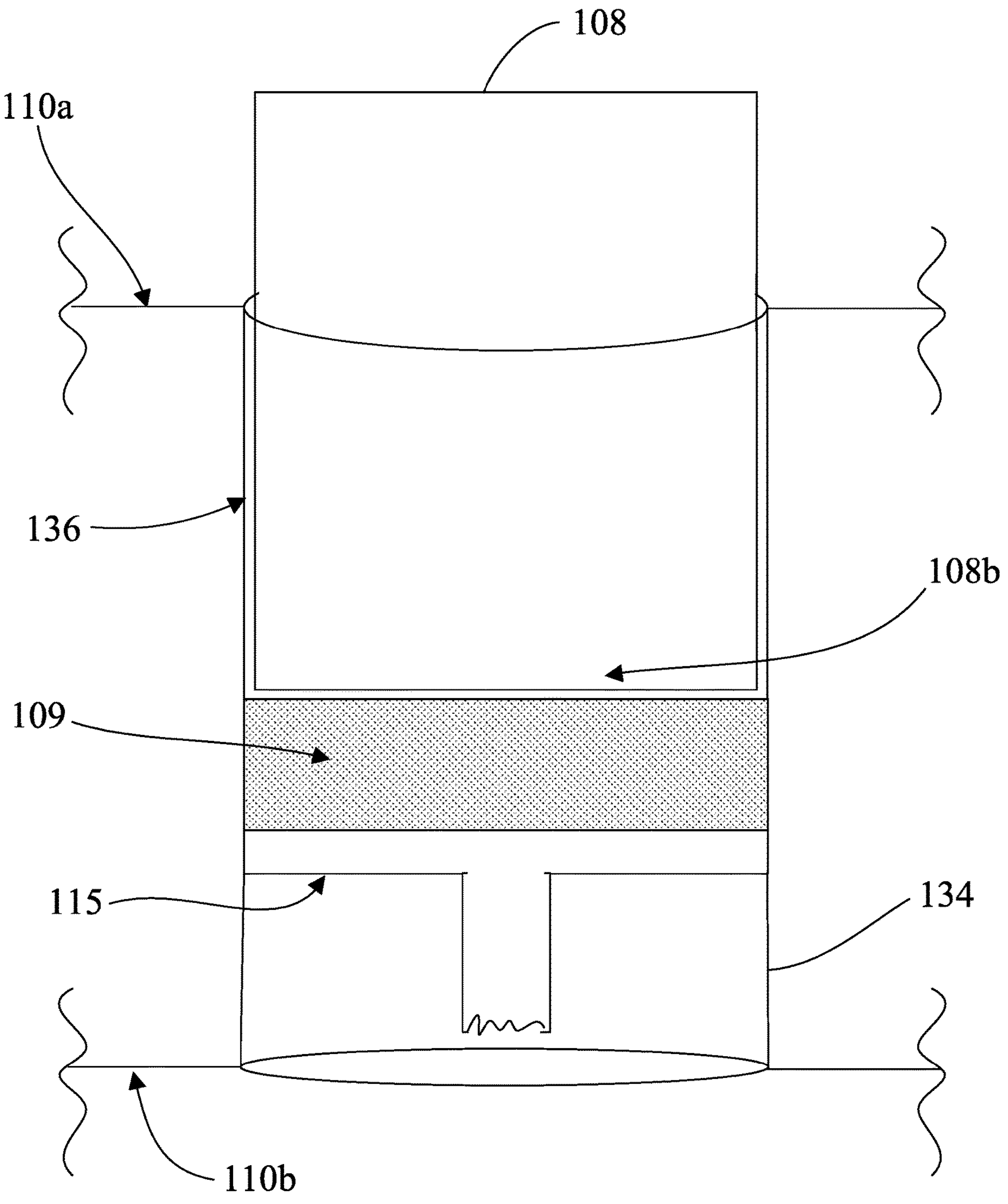
FIG. 7 is a front interior view of a dosing receptacle in accordance with certain embodiments of the invention.

The rotatable dosing disc 110 has a first surface 110*a* and a second surface 110*b*. As shown in FIGS. 2, 3, and 7, the rotatable dosing disc 110 includes at least one bore 134 extending from the first surface 110*a* of the rotatable dosing disc 110 to the second surface 110*b* of the rotatable dosing disc 110. The bore 134 is configured to receive the tamping pin 108. In some embodiments, for example, as shown in FIGS. 2-4, the rotatable dosing disc 110 may include a plurality of bores. In certain embodiments, each of the plurality of bores may have a different diameter from the other bores, and each bore diameter may correspond to a standardized capsule size and may define a different volume within the rotatable dosing disc corresponding to the respective standardized capsule size. For example, in certain embodiments, the tamping simulator may include up to eight bores having diameters corresponding to standardized capsule sizes ranging from 5 to 000 (e.g., 5, 4, 3, 2, 1, 0, 00, and 000 capsule sizes). In certain embodiments, the markings designating capsule sizes may be in color and/or engraved (e.g., via laser or any other suitable method understood by a person of ordinary skill in the art) to improve marking visibility. In certain embodiments, the bore size being used may also correspond to the same tamping pin size (e.g., a size 3 bore may be paired with a size 3 tamping pin). In some embodiments, the plurality of bores 134 may be evenly-spaced around the circumference of the rotatable dosing disc 110. For example, in certain embodiments each of the plurality of evenly-spaced bores 134 may be disposed at one of a plurality of tamping stations 130 positioned around the circumference of the rotatable dosing disc 110. In some embodiments, for instance, the tamping simulator 100 may include eight tamping positions 130, each having different settings such that the operator can select the proper tamping station based on the capsule size being dosed. In this way, the tamping simulator 100 may be reconfigured to use a different tamping station having a different bore size and being associated with a different tamping pin.

According to certain embodiments, the rotatable dosing disc 110 also includes at least one thickness adjustment device 112. In some embodiments, the rotatable dosing disc 110 may include a plurality of thickness adjustment devices 112. In such embodiments, each of the plurality of thickness adjustment devices 112 may be disposed at one of the plurality of tamping stations 130 such that each of the plurality of thickness adjustment devices 112 may be operably coupled to one of the plurality of evenly-spaced bores 134. Indeed, each thickness adjustment device 112 is disposed at the second surface 110*b* of the rotatable dosing disc 110 and is operably coupled to the bore 134 to adjust the thickness, or depth, of the bore 134. In particular, the thickness adjustment device 112 may include a threaded pin

114. In some embodiments, the threaded pin 114 may have a diameter substantially equal to the diameter of the bore 134 such that there is only enough space between the threaded pin 114 and the walls of the bore 134 so that the threaded pin 114 moves without friction while also preventing leaks. In certain embodiments, the thickness adjustment device 112 may also include a plunger 115 operably coupled to the threaded pin 114 and disposed internally in the thickness adjustment device 112 such that the plunger 115 forms a sealing plate that defines the bottom of a dosing receptacle 136 within the rotatable dosing disc 110, as shown, for example, in FIG. 7. The dosing receptacle is further defined by the walls of bore 134 and is configured to receive the powder compressed by the tamping pin 108 into the rotatable dosing disc 110. In this way, adjusting the bore thickness via the plunger 115 also modifies the volume of the dosing receptacle 136 in order to accommodate different dosages for filling capsules. The thickness adjustment device 112 may further include a rotatable dial 118 operably coupled to the threaded pin 114. In this way, the rotatable dial 118 may be used to adjust the position of the plunger 115 in relation to the bore 134 in order to adjust the volume of the dosing receptacle 136, as indicated on the thickness scale 119 operably coupled to the rotatable dial 118. In some embodiments, the rotatable dial 118 may be a floor that pushes the plunger 115 up into the rotatable dosing disc 110 as the rotatable dial 118 is turned. In addition, the thickness adjustment device 112 may include a stopper 116 having a diameter larger than that of the threaded pin 114 and, consequently, the bore 134. In contrast to filling equipment that requires various different discs to be physically replaced to accommodate different bore thicknesses, the thickness adjustment device 112 allows one rotatable dosing disc 110 to be used to simulate a number of disc thickness configurations. In certain embodiments, the markings for the thickness scale 119 may be in color and/or engraved (e.g., via laser or any other suitable method understood by a person of ordinary skill in the art) to improve marking visibility.

In addition, according to certain embodiments, the tamping simulator 100 may also include a tray 138. In operation, and as shown in FIG. 2, the tray 138 may be attached to the second surface 110*b* of the rotatable dosing disc 110 and may be used to collect the powder at the conclusion of the process. When the tray 138 is not in use, the tray 138 may be hung on the side of the body 101, as shown in FIG. 3.

The tamping simulator 100 also includes a tamping spring 122. The tamping spring 122, which may be a standardized tamping spring, is operably coupled to the first end 108*a* of the tamping pin 108 and, in operation, absorbs the compression pressure generated when lowering the tamping pin 108 into the dosing receptacle 136. In this way, the tamping pin 108 may be pushed through the powder cylinder 106 and into the dosing receptacle 136 with greater force without causing damage. In other words, the tamping spring 122 may thus provide protection to the parts on either end of the spring as pressure is built up during slug formation. Without the presence of the tamping spring 122, the tamping pin, and all associated parts, could receive damage from the parts above it that are driving it down through the powder, and the parts above the spring may also be susceptible to damage.

The tamping spring 122 is operably coupled to a compression scale 124 disposed on the tamping bracket 102. The compression scale 124 indicates the amount of compression pressure that is absorbed by the tamping spring 122 via markings on the compression scale 124 that are read by an operator. In some embodiments, the markings may be in color and/or engraved (e.g., via laser or any other suitable method understood by a person of ordinary skill in the art) to improve marking visibility. In certain embodiments, and as shown in FIG. 1, the compression scale 124 may measure compression pressure from maximum to minimum; however, the compression scale 124 may measure compression pressure via any suitable quantification method as understood by a person of ordinary skill in the art. In this way, the operator may monitor the amount of pressure that is absorbed to ensure that the tamping springs 122 are not being over-compressed. For example, the operator may monitor to ensure that the maximum point marked on the compression scale 124 is not exceeded.

According to certain embodiments, the tamping simulator 100 may also include a penetration scale 126 disposed on the tamping bracket 102. The penetration scale 126 may indicate the depth of the compression by the tamping pin 108 within the bore 134 when the tamping pin 108 is in the lowered position. In this way, the penetration scale 126 may indicate the correct compression depth needed to reach the correct end capsule weight. As shown in FIG. 1, the penetration scale 126 may measure compression depth from 0-25 mm as indicated by markings thereon; however, the penetration scale 126 may measure compression depth via any suitable quantification method as understood by a person of ordinary skill in the art. In some embodiments, and as shown in FIG. 1 for example, the penetration scale 126 may measure compression depth from 0-25 mm in ascending order. In addition or the alternative, however, the penetration scale 126 may measure compression depth from 25-0 mm in descending order, for instance, next to the existing ascending number scale. In certain embodiments, the markings may be in color and/or engraved (e.g., via laser or any other suitable method understood by a person of ordinary skill in the art) to improve marking visibility. In some embodiments, the penetration depth may be adjusted each time the powder is compressed. By way of example only, in certain embodiments the same powder may be successively compressed within the bore 134 a total of five times to achieve the appropriate compression, with a first compression penetration at 25 mm, a second compression penetration at 15 mm, a third compression penetration at 10 mm, a fourth compression penetration at 5 mm, and a fifth compression penetration at 0 mm. In some embodiments, a penetration adjustment knob 128 may be operably coupled to the penetration scale 126 to adjust the compression depth of the tamping pin 108 within the bore 134 when the tamping pin 108 is in the lowered position. Accordingly, the compression scale 124 and the penetration scale 126 may be used together to establish the tamping settings for the tamping simulator 100.

According to certain embodiments, the tamping simulator 100 may further include a powder dispersal mechanism (not shown). In this way, the powder may be dispersed in the powder cylinder 106 after the tamping pin 108 compresses the powder in the dosing receptacle 136 such that the powder is refreshed and refills the bore 134. In such embodiments, the powder dispersal mechanism may include a disc ratcheting mechanism, a powder stirring mechanism, or a combination thereof. In certain embodiments, for instance, the rotatable dosing disc 110 may be ratcheted a full revolution (i.e. rotated 360°) to disperse powder in the powder cylinder 106 after compression with the tamping pin 108 has been completed and the tamping pin 108 is returned to the raised position. For example, to replicate the five compressions typically performed by filling equipment, the rotatable dosing disc 110 may be ratcheted one full revolution five times, with each ratchet occurring after a compression. In addition or alternatively, the powder may be stirred to disperse powder in the powder cylinder 106 after each compression with the tamping pin 108 by a powder stirring mechanism as understood by a person of ordinary skill in the art. Suitable powder stirring mechanisms may include, but are not limited to, devices configured for trituration (e.g., a glass mortar), spatulation (e.g., a powder spatula), sifting (e.g., a sifter or a sieve), or a powder plow or diverter, as understood by a person of ordinary skill in the art.

According to certain embodiments, the tamping simulator may be smaller than standard filling equipment. For example, in some embodiments the tamping simulator may be a tabletop device capable of being placed in the production area and/or the research and development area. By including the tamping simulator in these areas, time and money will be saved by pre-determining settings on-site on an as-needed basis and reducing waste that may otherwise result from conventional trial-and-error methods. In addition, the tamping simulator may be compatible with filling equipment used for all types of capsules and in a variety of sizes, including but not restricted to gelatin capsules and hydroxypropyl methylcellulose ("Hypromellose" or "HPMC") capsules, pullulan capsules, and other capsule polymers.

In this regard, the tamping simulator replicates and predicts filling equipment settings including, but not limited to, tamping pin settings for one or more tamping stations, dosing disc thickness, powder level settings, slug forming qualities, or any combination thereof. These settings, particularly disc thickness, tamping pin settings, and powder level settings, may be used to determine end capsule weight. In this way, the tamping simulator improves the efficiency of the capsule production process.

II. Methods of Replicating and Predicting Settings for Tamping Style Capsule Filling Equipment In another aspect, a method of replicating and predicting settings for tamping style capsule filling equipment for a powder is provided. The method includes selecting a bore diameter, a bore thickness, and a tamping pin size; receiving a volume of powder in a powder cylinder; compressing the powder into a dosing receptacle defined by a plunger and walls of a bore of a rotatable dosing disc having the selected bore diameter and the selected bore thickness by moving a tamping pin having the selected tamping pin size from a raised position to a lowered position into the powder cylinder and the dosing receptacle; and indicating an amount of compression pressure absorbed by a tamping spring operably coupled to the tamping pin in an instance in which the tamping pin is moved to the lowered position.

Figure 5:
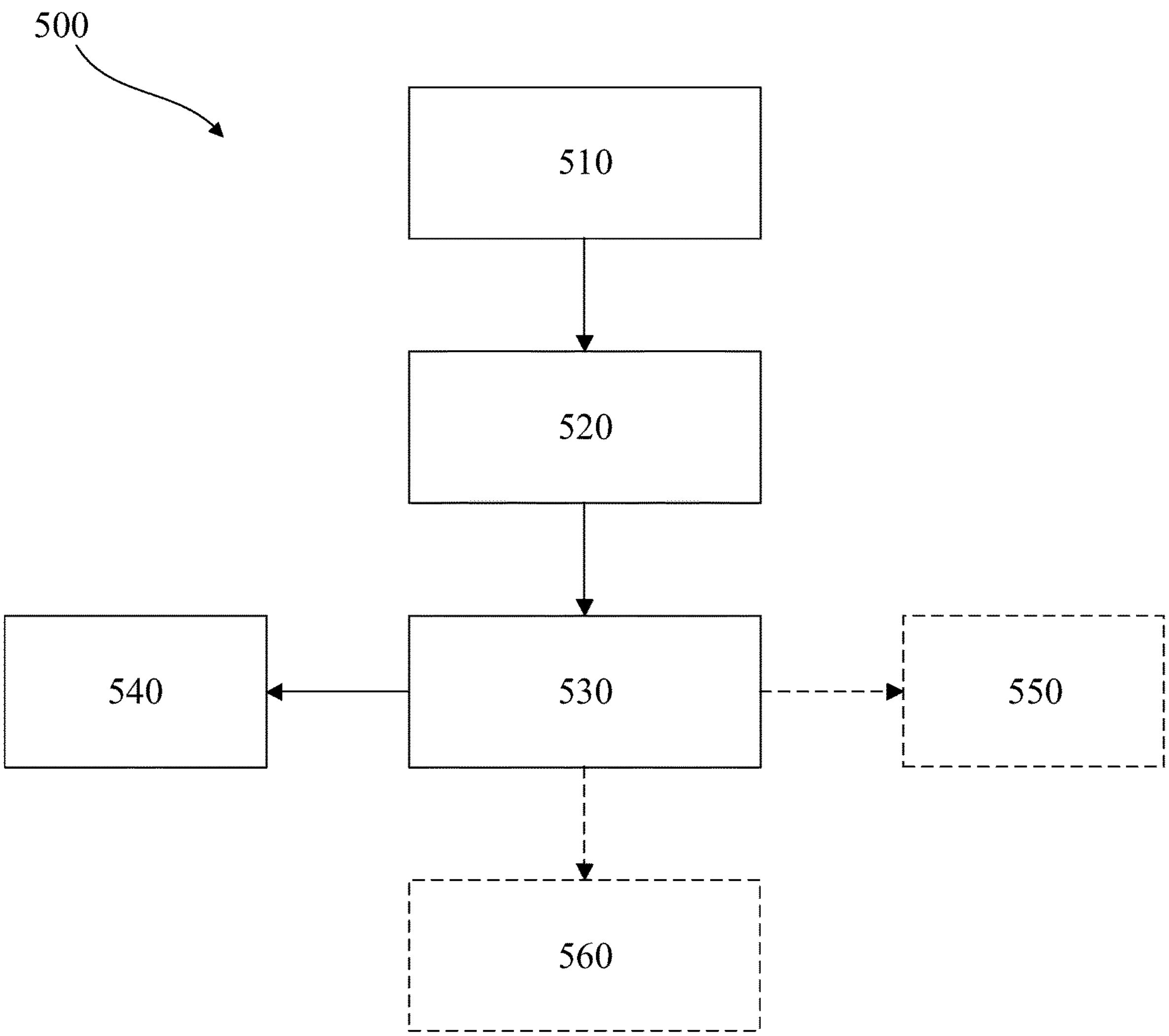
FIG. 5 is a block diagram of a method of replicating and predicting settings for tamping style capsule filling equipment for a powder in accordance with certain embodiments of the invention.

FIG. 5, for example, is a block diagram of a method 500 of replicating and predicting settings for tamping style capsule filling equipment for a powder in accordance with certain embodiments of the invention. As shown in FIG. 5, the method 500 includes the following steps:

Step 510: Selecting a bore diameter, a bore thickness, and a tamping pin size;

Step 520: Receiving a volume of powder in a powder cylinder;

Step 530: Compressing the powder into a dosing receptacle defined by a plunger and walls of a bore of a rotatable dosing disc having the selected bore diameter and the selected bore thickness by moving a tamping pin having the selected tamping pin size from a raised position to a lowered position into the powder cylinder and the dosing receptacle; and Step 540: Indicating an amount of compression pressure absorbed by a tamping spring operably coupled to the tamping pin in an instance in which the tamping pin is moved to the lowered position; and, optionally (e.g., in standard cases):

Step 550: Indicating tamping pin penetration into the dosing receptacle; and Step 560: Dispersing the powder in the powder cylinder after compressing the powder into the dosing receptacle.

Figure 6:
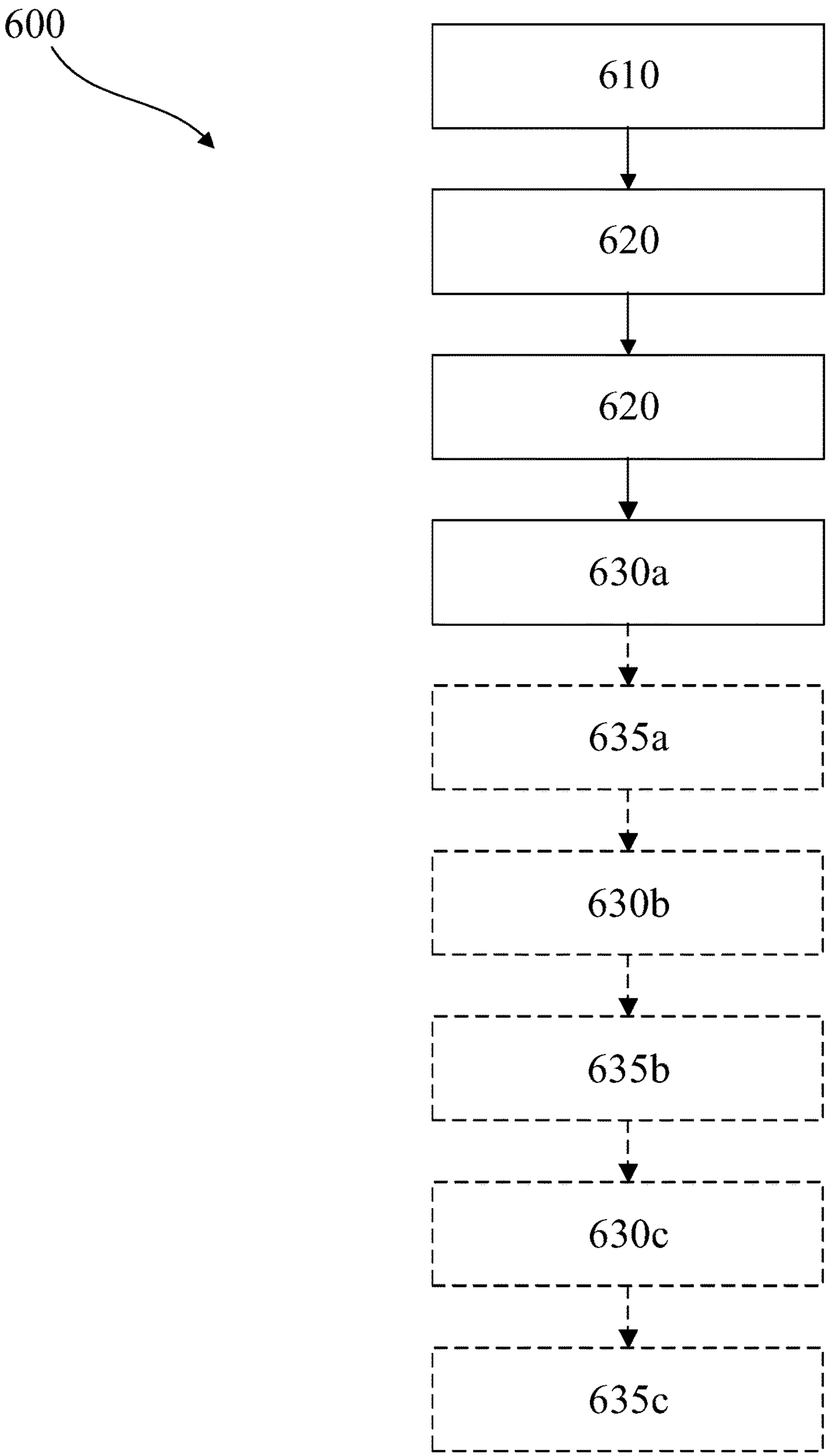
FIG. 6 is another block diagram of a method of replicating and predicting settings for tamping style capsule filling equipment for a powder in accordance with certain embodiments of the invention.

In some embodiments, certain steps of the method are repeated until the desired volume of powder in the dosing receptacle is achieved. FIG. 6, for example, is a block diagram of a method 600 of replicating and predicting settings for tamping style capsule filling equipment for a powder in accordance with certain embodiments of the invention. As shown in FIG. 6, the method 600 includes the following steps:

Step 610: Selecting a bore diameter and a tamping pin size;

Step 615: Setting the bore thickness and matching the bore thickness to the penetration scale setting (e.g., the "Zero" point for the penetration scale may be set each time the dosing disc thickness is changed);

Step 620: Receiving a volume of powder in a powder cylinder; and

Step 630*a*: Compressing the powder into a dosing receptacle defined by a plunger and walls of a bore of a rotatable dosing disc having the selected bore diameter and the selected bore thickness by moving a tamping pin having the selected tamping pin size from a raised position to a lowered position into the powder cylinder and the dosing receptacle; and Step 635*a*: Dispersing the powder in the powder cylinder after compressing the powder into the dosing receptacle;

Step 630*b*: Compressing the powder into the dosing receptacle;

Step 635*b*: Dispersing the powder in the powder cylinder after compressing the powder into the dosing receptacle;

Step 630*c*: Compressing the powder into the dosing receptacle; and

Step 635*c*: Dispersing the powder in the powder cylinder after compressing the powder into the dosing receptacle.

In this regard, the method replicates and predicts filling equipment settings including, but not limited to, tamping pin settings for one or more tamping stations, dosing disc thickness, powder level settings, slug forming qualities, or any combination thereof. These settings, particularly disc thickness, powder level settings, and tamping pin settings, may be used to determine end capsule weight. In this way, the method improves the efficiency of the capsule production process.

Modifications of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A tamping simulator comprising:

a powder cylinder;

a dosing receptacle laterally defined by a bore, wherein a bottom of the dosing receptacle is defined by a moveable plunger such that a volume of the dosing receptacle is adjustable via movement of the plunger;

a tamping pin having a first end and a second end, the tamping pin being configured to be moved between a raised position and a lowered position such that the second end is received into the powder cylinder and the dosing receptacle in an instance in which the tamping pin is in the lowered position;

a tamping spring operably coupled to the first end of the tamping pin and being configured to relieve compression pressure from the tamping pin;

a compression scale operably coupled to the tamping spring and being configured to indicate an amount of compression pressure absorbed by the tamping spring; and a rotatable dial operably coupled to the plunger, wherein the plunger is movable via actuation of the rotatable dial.

2. The tamping simulator according to claim 1, further comprising a penetration scale disposed between the compression scale and the tamping spring, the penetration scale being configured to indicate tamping pin depth within the dosing receptacle.

3. The tamping simulator according to claim 1, further comprising a handle operably connected to the first end of the tamping pin, the handle being configured to move the tamping pin between the raised position and the lowered position.

4. The tamping simulator according to claim 1, wherein the tamping simulator comprises a plurality of tamping pins, each of the plurality of tamping pins having a different standardized pin size.

5. The tamping simulator according to claim 1, further comprising a powder dispersal mechanism.

6. The tamping simulator according to claim 5, wherein the powder dispersal mechanism comprises a disc ratcheting mechanism or a powder stirring mechanism.

7. The tamping simulator according to claim 1, wherein the powder cylinder comprises clear glass or clear plastic.

8. The tamping simulator according to claim 1, wherein the tamping simulator is configured to replicate and predict settings for tamping style capsule filling equipment for a target drug, dietary supplement, or nutritional supplement, wherein the settings comprise tamping pin settings for one or more tamping stations, dosing disc thickness, powder level settings, slug forming qualities, or any combination thereof.

9. The tamping simulator according to claim 1, further comprising a rotatable dosing disc, wherein the bore is defined through the rotatable dosing disc.

10. The tamping simulator according to claim 1, wherein the tamping simulator comprises a plurality of dosing receptacles.

11. The tamping simulator according to claim 10, further comprising a rotatable dosing disc defining a plurality of bores, wherein each dosing receptacle is laterally defined by one of the plurality of bores, and wherein a bottom of each dosing receptacle is defined by a moveable plunger such that a volume of each dosing receptacle is adjustable via movement of a respective plunger.

12. The tamping simulator according to claim 11, wherein each of the plurality of bores is disposed at one of a plurality of tamping stations positioned around a circumference of the rotatable dosing disc.

13. The tamping simulator according to claim 12, wherein each of the plurality of bores has a different diameter.

14. The tamping simulator according to claim 1, further comprising a thickness scale proximate the dosing receptacle and configured to indicate the volume of the dosing receptacle based on a position of the plunger.

15. A tamping simulator comprising:

a powder cylinder;

a plurality of dosing receptacles, a rotatable dosing disc defining a plurality of bores therethrough, wherein each dosing receptacle is laterally defined by one of the plurality of bores, wherein a bottom of the dosing receptacle is defined by a moveable plunger such that a volume of the dosing receptacle is adjustable via movement of the plunger;

a tamping pin having a first end and a second end, the tamping pin being configured to be moved between a raised position and a lowered position such that the second end is received into the powder cylinder and one of the plurality of dosing receptacles in an instance in which the tamping pin is in the lowered position;

a tamping spring operably coupled to the first end of the tamping pin and being configured to relieve compression pressure from the tamping pin; and a compression scale operably coupled to the tamping spring and being configured to indicate an amount of compression pressure absorbed by the tamping spring, wherein each of the plurality of bores is disposed at one of a plurality of tamping stations positioned around a circumference of the rotatable dosing disc, and wherein each of the plurality of bores has a different diameter.

16. The tamping simulator according to claim 15, wherein the tamping simulator comprises a plurality of tamping pins, each of the plurality of tamping pins having a different standardized pin size.

17. The tamping simulator according to claim 15, further comprising a powder dispersal mechanism.

18. The tamping simulator according to claim 17, wherein the powder dispersal mechanism comprises a disc ratcheting mechanism or a powder stirring mechanism.

19. The tamping simulator according to claim 15, wherein the tamping simulator is configured to replicate and predict settings for tamping style capsule filling equipment for a target drug, dietary supplement, or nutritional supplement, wherein the settings comprise tamping pin settings for one or more tamping stations, dosing disc thickness, powder level settings, slug forming qualities, or any combination thereof.

20. The tamping simulator according to claim 15, further comprising a rotatable dial operably coupled to the plunger, wherein the plunger is movable via actuation of the rotatable dial.

* * * * *